(12) United States Patent
Wang

(10) Patent No.: US 8,447,323 B2
(45) Date of Patent: May 21, 2013

(54) DOWNLINK SILENT PERIOD FOR POSITIONING

(75) Inventor: Shu Wang, San Diego, CA (US)

(73) Assignee: LG Electronics Inc., Seoul (KR)

( * ) Notice: Subject to any disclaimer, the term of this patent is extended or adjusted under 35 U.S.C. 154(b) by 588 days.

(21) Appl. No.: 12/554,661

(22) Filed: Sep. 4, 2009

(65) Prior Publication Data
US 2010/0069089 A1    Mar. 18, 2010

Related U.S. Application Data

(60) Provisional application No. 61/094,851, filed on Sep. 5, 2008.

(51) Int. Cl.
*H04W 24/00*    (2009.01)

(52) U.S. Cl.
USPC .......... 455/456.1; 455/456.2; 455/452.1; 455/453; 455/507; 455/9; 455/513; 455/501; 455/509; 455/426.1; 370/315; 370/330; 370/329; 370/328; 370/437; 370/252; 370/503; 370/350; 370/335; 370/352; 370/331

(58) Field of Classification Search
USPC .......... 370/315, 330, 329, 328, 437, 252, 370/503, 350, 335, 352, 331; 455/456.2, 455/456.1, 452.1, 453, 507, 9, 513, 501, 455/509, 426.1
See application file for complete search history.

(56) References Cited

U.S. PATENT DOCUMENTS

| | | | |
|---|---|---|---|
| 6,104,930 A * | 8/2000 | Ward et al. | 455/450 |
| 6,442,392 B2 * | 8/2002 | Ruutu et al. | 455/456.1 |
| 6,898,195 B1 * | 5/2005 | Molno et al. | 370/329 |
| 2001/0051526 A1 | 12/2001 | Ruutu et al. | |
| 2004/0082356 A1 * | 4/2004 | Walton et al. | 455/522 |
| 2004/0174845 A1 * | 9/2004 | Koo et al. | 370/328 |
| 2006/0148491 A1 | 7/2006 | Hyun et al. | |
| 2007/0139267 A1 * | 6/2007 | Black et al. | 342/385 |
| 2008/0261623 A1 * | 10/2008 | Etemad et al. | 455/456.2 |

(Continued)

FOREIGN PATENT DOCUMENTS

CN    1357211    7/2002

OTHER PUBLICATIONS

Motorola, "Time Aligned IP-DL Positioning Technique," TSG-RAN Working Group 1, Ah Hoc 17, Meeting 7, TSGR1#7 (99)b79, Aug. 1999.

(Continued)

*Primary Examiner* — Joseph Arevalo
(74) *Attorney, Agent, or Firm* — Lee, Hong, Degerman, Kang & Waimey

(57) ABSTRACT

A method for acquiring positioning information includes receiving, at a mobile terminal (MT), downlink data in a plurality of downlink slot frames from a serving base station transmitting the downlink data over a first time period generally corresponding to the plurality of downlink slot frames. The MT experiences a relatively silent period during which the serving base station substantially ceases transmission to the mobile terminal during a second time period that defines a transmission power modification period. The MT also receives a preamble broadcasted by various neighbor base stations, the preamble broadcasted by such base stations occurring during a third time period which at least partially overlaps the second time period. The location or position estimate of the MT can be calculated based upon at least the preamble broadcasted by the neighbor base stations.

6 Claims, 11 Drawing Sheets

U.S. PATENT DOCUMENTS

| | | | |
|---|---|---|---|
| 2009/0176507 A1* | 7/2009 | Wu et al. | 455/456.2 |
| 2009/0303918 A1* | 12/2009 | Ma et al. | 370/315 |
| 2010/0150051 A1* | 6/2010 | Hart et al. | 370/315 |
| 2010/0150100 A1* | 6/2010 | Chen et al. | 370/330 |
| 2010/0202401 A1* | 8/2010 | Hwang et al. | 370/330 |

OTHER PUBLICATIONS

In the Intellectual Property Office of China Application Application No. 200980105152.5, Office Action dated Nov. 14, 2012, 7 pages.

* cited by examiner

DOWNLINK SILENT PERIOD FOR POSITIONING

CROSS-REFERENCE TO RELATED APPLICATIONS

Pursuant to 35 U.S.C. §119(e), this application claims the benefit of priority to Provisional Application No. 61/094,851, filed on Sep. 5, 2008, the contents of which are incorporated by reference herein in their entirety.

FIELD OF THE INVENTION

The present invention relates to wireless communications, and in particular, to a method for acquiring positioning information.

DESCRIPTION OF THE RELATED ART

The need for more efficient and reliable positioning services and techniques in wireless communication networks is continuously increasing, especially given the positioning requirements set forth by the FCC Enhanced 911 and European Union (EU) Location-Enhanced 112 systems. Under the FCC Enhanced 911 system, Phase I states that within six months of a request by a Public Safety Answer Point (PSAP), the carrier will provide PSAPs with the telephone number and the cell site location for a 911 call.

Phase II relates to the notion that within six months of a request by a PSAP, more precise location information, such as the latitude and longitude of the caller, is to be provided. For network-based solutions, the standard for accuracy and reliability is on the order of 100 meters for 67% of calls and 300 meters for 95% of calls. For handset-assisted solutions, the standard for accuracy and reliability is on the order of 50 meters for 67% of calls and 150 meters for 95% of calls.

In 2000, the European Union (EU) launched activities for enhanced 112 (E-112) and the Coordination Group on Access to Location Information for Emergency Services (CGALIES) was initiated. An emergency management telecommunication (EMTEL) ad hoc group under the European Telecommunications Standards Institute (ETSI) Operational Co-ordination Group (OCG) was later set up to consider the standardization requirements. The EU further issued a recommendation for the Europe-wide implementation of the location-enhanced 112.

SUMMARY

In one embodiment of the present invention, a method for acquiring positioning information includes receiving, at a mobile terminal, downlink data in a plurality of downlink slot frames from a serving base station transmitting the downlink data over a first time period generally corresponding to the plurality of downlink slot frames; experiencing a relatively silent period during which the serving base station substantially ceases transmission to the mobile terminal during a second time period that defines a transmission power modification period; receiving, at the mobile terminal, a preamble broadcasted by each of at least one neighbor base station, the preamble broadcasted by each of the at least one neighbor base station being broadcasted during a third time period which at least partially overlaps the second time period; and calculating a location estimate of the mobile terminal based upon at least the preamble broadcasted by each of the at least one neighbor base station.

In another embodiment of the present invention, a method for acquiring positioning information includes receiving, at a mobile terminal, downlink data in a plurality of downlink slot frames from a serving base station transmitting the downlink data over a first time period generally corresponding to the plurality of downlink slot frames; receiving, at the mobile terminal, a serving base station preamble that precedes in time the plurality of downlink slot frames, wherein the serving base station preamble comprises a transmission strength and is generally received by the mobile terminal during a second time period; receiving, at the mobile terminal, a neighbor base station preamble broadcasted by each of a plurality of neighbor base stations, each of the neighbor base station preambles comprising a transmission strength and being received from each of the plurality of neighbor base stations during a third time period which generally corresponds with the second time period, wherein the transmission strength of a first group of the neighbor base station preambles is greater relative to previous transmissions of a preamble by an associated neighbor base station of the first group, while the transmission strength of a second group of the neighbor base station preambles is substantially the same relative to a previous transmission of a preamble by an associated neighbor base station of the second group; varying over time which of the plurality of neighbor base stations are included in the first group and which of the plurality of neighbor base stations are included in the second group; and calculating a location estimate of the mobile terminal based upon at least the preamble broadcasted by each of the plurality of neighbor base stations.

In yet another embodiment of the present invention, a method for acquiring positioning information includes receiving, at a mobile terminal, downlink data in a plurality of downlink slot frames from a serving base station transmitting the downlink data over a first time period generally corresponding to the plurality of downlink slot frames; receiving, at the mobile terminal, a serving base station preamble that precedes in time the plurality of downlink slot frames, wherein the serving base station preamble comprises a transmission strength and is generally received by the mobile terminal during a second time period; receiving, at the mobile terminal, a neighbor base station preamble broadcasted by each of a plurality of neighbor base stations, each of the neighbor base station preambles comprising a transmission strength and being received from each of the plurality of neighbor base stations in a time staggered fashion such that the preambles broadcasted by each of the plurality of neighbor base stations do not overlap temporally, wherein the transmission strength of a first group of the neighbor base station preambles is greater relative to previous transmissions of a preamble by an associated neighbor base station of the first group, while the transmission strength of a second group of the neighbor base station preambles is substantially the same relative to a previous transmission of a preamble by an associated neighbor base station of the second group; varying over time which of the plurality of neighbor base stations are included in the first group and which of the plurality of neighbor base stations are included in the second group; and calculating a location estimate of the mobile terminal based upon at least the preamble broadcasted by each of the plurality of neighbor base stations.

These and other embodiments will also become readily apparent to those skilled in the art from the following detailed description of the embodiments having reference to the attached figures, the present disclosure not being limited to any particular embodiment disclosed.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION OF PREFERRED EMBODIMENTS

Figure 1:
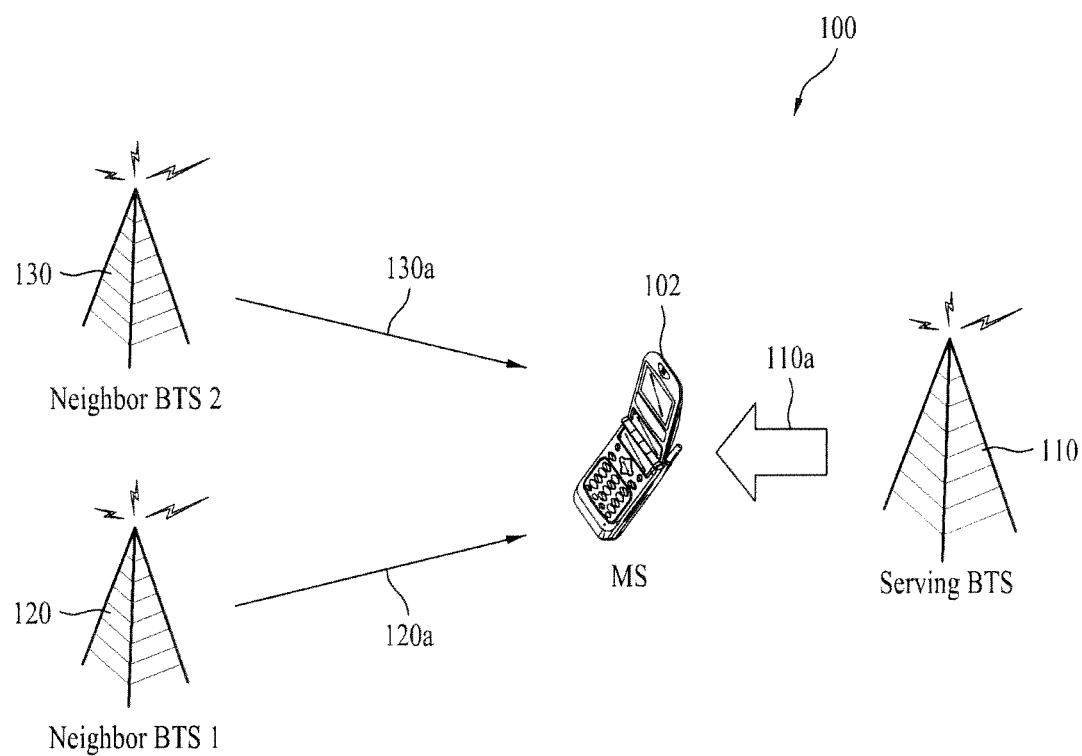
FIG. 1 shows a wireless communication network configured to provide or permit various types of positioning techniques.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

In general, providing efficient and reliable positioning services in wireless communication networks has proven to be difficult because various drawbacks exist in both downlink and uplink approaches for determining the position of a mobile station within wireless communication networks. For example, uplink (UL) approaches generally impose fewer burdens on a mobile station since the network side typically has enough resources for performing positioning. Typically, UL approaches have low latency and do not require a feedback channel. Although UL approaches are flexible and can operate independent of standards, the typical transmit signal power of a mobile station is usually not strong.

Many downlink (DL) approaches involve mobile stations in the positioning procedures. Some DL approaches benefit by using the DL pilot channel which is generally very strong and consistent. In some scenarios, the DL pilot channel is used by mobile stations in a wireless communication network to perform positioning via time-difference of arrival (TDOA) techniques. Other DL approaches permit the positioning feedback channel to be shared with other channels, which may delay positioning. It is understood that mobile stations often have limited resources and knowledge.

One typical DL approach involves the mobile station being unable to detect the signals transmitted by various base transceiver stations (BTSs), also referred to herein as a base station (BS), in the wireless communication network to perform TDOA or other positioning techniques. Consequently, the mobile station may be unable to accurately determine the desired position. As a result, where positioning using the DL is implemented, network planning can include some challenges.

Various embodiments will be presented herein in the context of a wireless communication network and associated entities configured in accordance with the IEEE 802.16 standards family commonly referred to as WiMAX. However, alternatives to such implementations are envisioned and teachings with regard to the WiMAX standard are generally applicable to other standards and air interfaces as well. Moreover, the use of certain terms to describe various embodiments should not limit such embodiments to a certain type of wireless communication system, such as WiMAX. Various embodiments are also applicable to other wireless communication systems using different air interfaces and/or physical layers including, for example, frequency division multiple access (FDMA), time division multiple access (TDMA), code division multiple access (CDMA), wideband CDMA (W-CDMA), and universal mobile telecommunications system (UMTS), the long term evolution (LTE) of the UMTS, and the global system for mobile communications (GSM). By way of non-limiting example only, further description will relate to a WiMAX communication system, but such teachings apply equally to other system types.

FIG. 1 shows wireless communication network 100 configured to provide or permit various types of positioning techniques. Signal 110a is shown transmitted from serving BTS 110 to mobile station (MS) 102. In some cases, the MS 102 may be implemented as a mobile terminal, user equipment, subscriber station, and the like. In some situations, signaling from BTS 110 has the potential to interfere with or otherwise drown out signaling (e.g., pilot signals) provided by, for example, neighboring BTS 120, 130. For instance, the example of FIG. 1 shows distant BTSs 120, 130 respectively transmitting signals 120a, 130a.

In general, serving BTS 110 may be configured to communicate with MSs located with operational range of the BTS. In this figure, BTS 110 is the serving BTS of MS 102. Signaling provided by the various serving and neighboring BTS are often in the form of multiple frames (e.g., orthogonal frequency-division multiple access (OFDMA) frames). Further examples of frames, timing, and other signaling features will be described in more detail in conjunction with later figures. It is understood that network 100 may alternatively be implemented using multiple MSs 102, and with most any number of BTSs.

Figure 2:
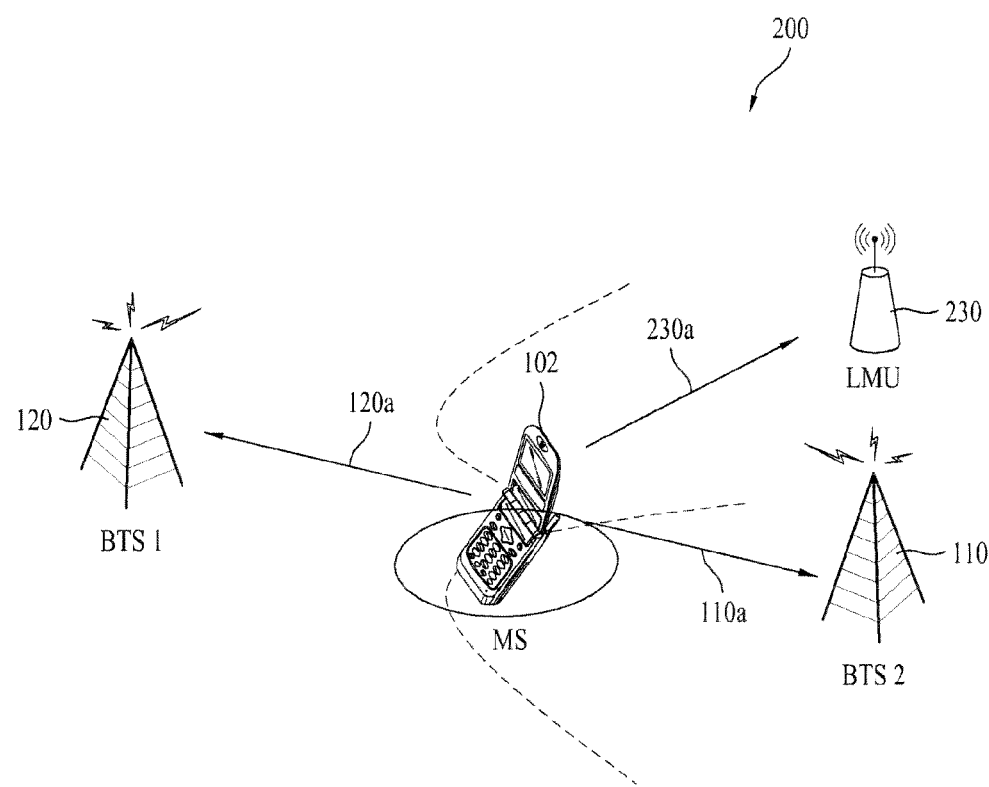
FIG. 2 also shows a wireless communication network configured to provide or permit various types of positioning techniques.

FIG. 2 shows a wireless communication network 200 configured to provide or permit various types of positioning techniques. In this figure, BTS 110 is again the serving base station transmitting signal 110a to MS 102, which is shown located at a cell edge. MS 102 is also shown receiving signaling (e.g., pilot signals) from neighboring BTS 120 and location measurement unit (LMU) 230. In particular, BTS 120 and LMU 230 are shown transmitting signals 120a, 230a, respectively. Similar to the scenario described in FIG. 1, signaling from BTS 120 and LMU may be interfered with or drowned out by signaling from serving BTS 110. Interference with the signaling from the neighboring stations (e.g., BTSs 120, 130, LMU 230) increases as the network frequency reuse factor approaches a factor of one. One approach to minimize or eliminate such interference is to implement additional mechanisms for DL positioning.

Figure 3:
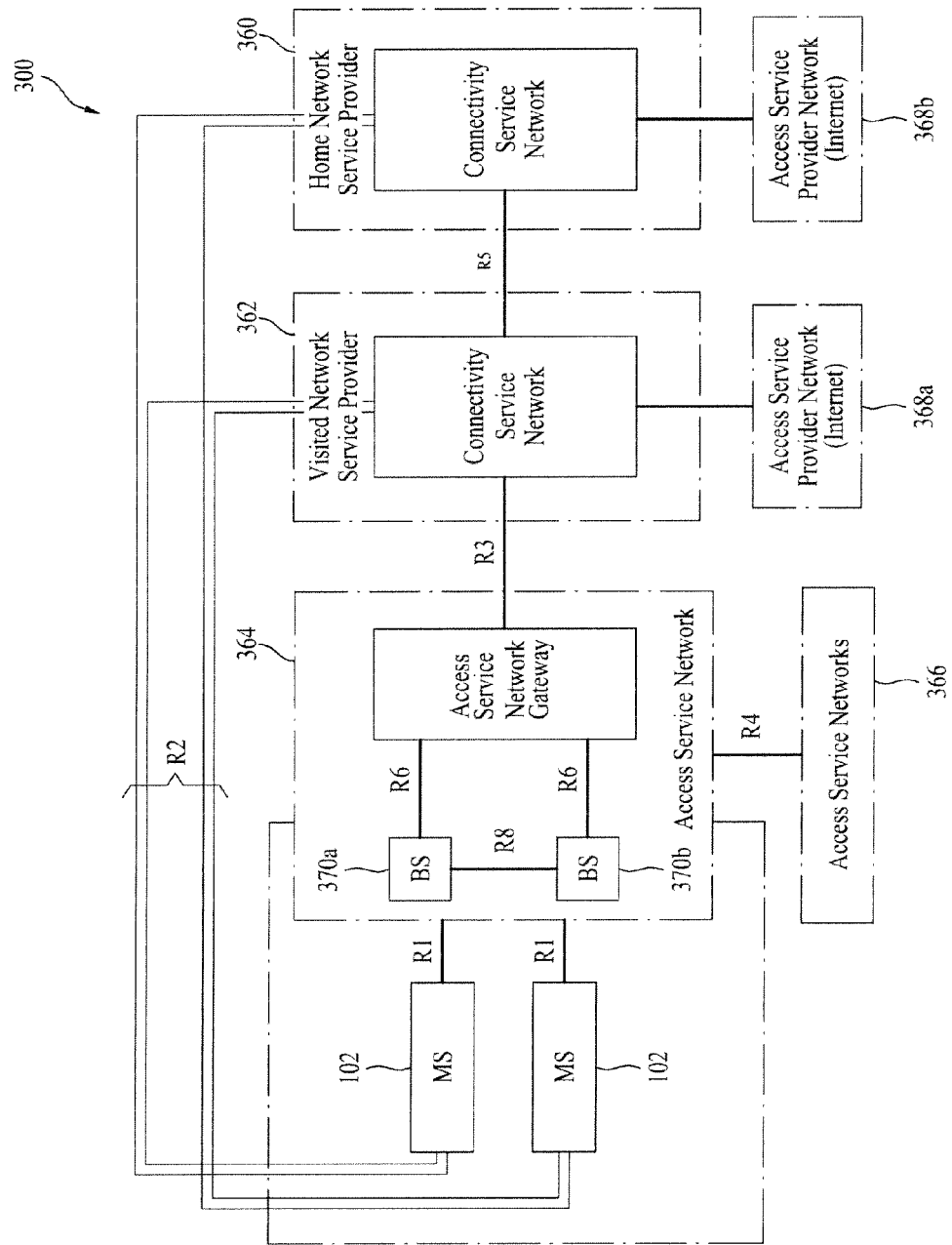
FIG. 3 is a block diagram of an exemplary communication network in accordance with various embodiments of the present invention

FIG. 3 is a block diagram of an exemplary communication network in accordance with various embodiments of the present invention. In this figure, communication network 300 includes a home network service provider ("home NSP") 360, a visited network service provider ("visited NSP") 362, an access service network (ASN) 364, access service networks 366, access service provider networks 368a and 368b. MSs 102 are separately shown in communication with respective serving BSs 370a, 370b. In some embodiments, the BSs 370a, 370b, are implemented in a manner similar to that of the BTSs of FIGS. 1 and 2.

A network service provider, such as home NSP 360 or visited NSP 362, may include a business entity that provides IP connectivity and WiMAX services to WiMAX subscribers compliant with the service level agreement it establishes with WiMAX subscribers. A technique for providing these services includes the NSP establishing an agreement with one or more network access providers, which are commonly implemented as business entities providing WiMAX radio access infrastructure to one or more WiMAX network service providers.

ASN 364 typically includes a logical boundary and represents an aggregation of functional entities and corresponding message flows associated with the access services. ASN 364 often includes a boundary for functional interoperability with WiMAX clients, WiMAX connectivity service functions, and aggregation of functions embodied by different vendors, for example.

In FIG. 3, ASN 364 is shown sharing R1 reference point (RP) with MSs 102, R3 RP with a connectivity service network (CSN) of visited NSP 362, and a R4 RP with ASN 366. ASN 364 typically include one or more base stations and one or more instances of an ASN gateway (ASN-GW). The R4 reference point is typically implemented for control and bearer planes for interoperability between similar or heterogeneous ASNs. Interoperability between various types of ASNs may be accomplished using the specified protocols and primitives exposed across R1, R3 and R4 reference points.

In some embodiments, the depicted base stations are entities that embody a full instance of the WiMAX media access control (MAC) and physical (PHY) layers in compliance with the relevant transmission protocol. In the embodiment of FIG. 3, these base stations may be configured to function or otherwise implement the IEEE 802.16 suite of applicable standards, and may host one or more access functions. In some scenarios, the base stations each represent one sector with one frequency assignment and incorporates scheduler functions for both uplink and downlink resources.

Connectivity (e.g., reachability) of BSs 370a, 370b to more than one ASN-GW may be required or desired to facilitate load balancing, redundancy, and the like. Note that each BS 370a and/or 370b is a logical entity, and a physical implementation of such logical entities may implement one or more base stations.

Reference point R1 typically includes protocols and procedures to facilitate communication between MS 102 and ASN 364. If desired, reference point R1 may also include additional protocols related to the management plane.

Reference point R2 generally includes protocols and procedures to facilitate communication between MS 110 and one or more CSNs. Reference point R2 is shown as a logical interface such that it does not reflect a direct protocol interface between a MS and the CSN.

The authentication part of reference point R2 is shown between MSs 102 and the CSN of home NSP 360. However the ASN and CSN of visited NSP 362 may partially or completely process the aforementioned procedures and mechanisms. Reference point R2 may also support IP host configuration management between the MSs 110 and the CSN (of either the home NSP 360 or the visited NSP 362).

Reference point R3 often includes a set of control plane protocols between ASN 364 and the CSN to support authentication, authorization, accounting (AAA), and the like, associated with a user (e.g., MS 102), and subscribed services across different access technologies. For example, AAA may include mechanisms for secure exchange and distribution of authentication credentials and session keys for data encryption.

Reference point R4 often includes a set of control and bearer plane protocols originating/terminating in various functional entities of an ASN that coordinate the mobility of MSs 102 between ASNs and ASN-GWs. In some scenarios, R4 is the only interoperable RP between similar or heterogeneous ASNs.

Reference point R5 may include a set of control plane and bearer plane protocols for internetworking between the CSN of the home NSP 360 and may be operated by the visited NSP 362.

The ASN gateway (ASN-GW) in ASN 364 is shown as a logical entity that represents an aggregation of control plane functional entities that are either paired with a corresponding function in the ASN (e.g., a BS instance), a resident function in the CSN, or a function in another ASN, such as ASN 366. The ASN-GW may also perform bearer plane routing or bridging function. ASN-GW implementation may include redundancy and load-balancing among several ASN-GWs.

In some embodiments, for each MS 102, a base station may be associated with only one default ASN GW. However, other embodiments permit ASN-GW functions for each MS to be distributed among multiple ASN-GWs located in one or more ASNs.

Reference point R6 generally includes a set of control and bearer plane protocols for communication between the BSs 370a and 370b and the ASN-GW. The bearer plane usually includes an intra-ASN data path between each of the BSs 370a and 370b and the ASN gateway. The control plane may include protocols for data path establishment, modification, and release control in accordance with the MS mobility events.

Reference point R7 may include an optional set of control plane protocols (e.g., for AAA and policy coordination in the ASN gateway), as well as other protocols for coordination between the various groups of functions identified in the reference point R6.

The decomposition of the ASN functions using the R7 protocols is optional.

Reference point R8 may include a set of control plane message flows and optionally bearer plane data flows between BSs 370a and 370b to facilitate handover. The bearer plane often includes protocols that allow the data transfer between BSs involved in handover of a certain MS, such as MSs 102. The control plane may include an inter-BS communication protocol and additional set of protocols that allow controlling of the data transfer between the BSs involved in handover of a certain MS.

In some embodiments, communication network 300 may include relay stations to provide improved coverage and/or capacity by establishing Layer-3 (L3) connectivity with an MS configured to communicate using a desired protocol (e.g., IEEE 802.16e, IEEE 802.16m, and the like).

Figure 4:
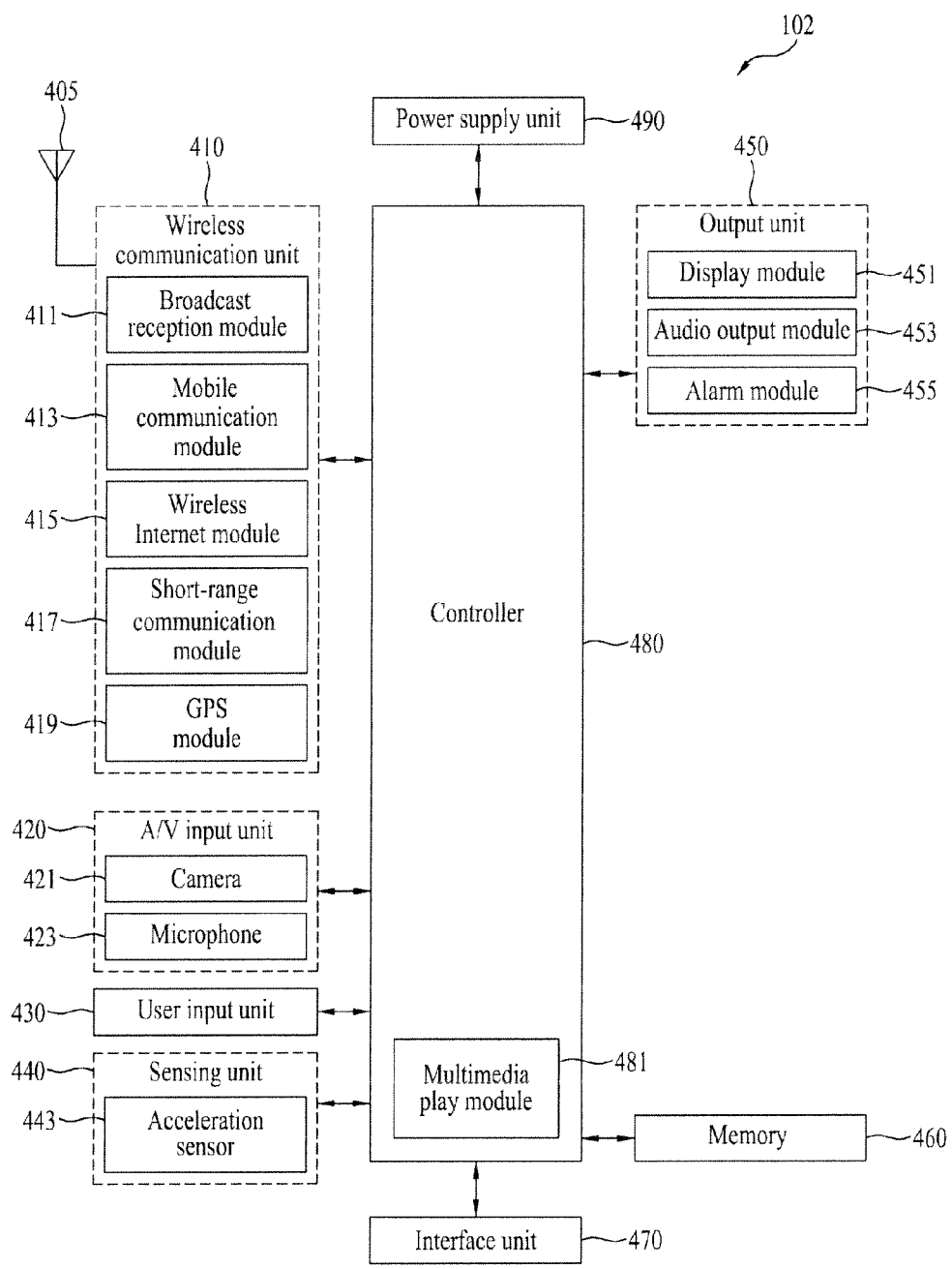
FIG. 4 is a block diagram showing in more detail various components which may be implemented in a mobile station according to various embodiment of the present invention.

FIG. 4 is a block diagram showing in more detail various components which may be implemented in MS 102 according to various embodiment of the present invention. It is understood that greater or fewer components than those shown may be implemented.

Referring to FIG. 4, the MS 102 may include a wireless communication unit 410, an audio/video (A/V) input unit 420, a user input unit 430, a sensing unit 440, an output unit 450, a memory 460, an interface unit 470, a controller 480, and a power supply unit 490. Two or more of the wireless communication unit 410, the A/V input unit 420, the user input unit 430, the sensing unit 440, the output unit 450, the memory 460, the interface unit 470, the controller 480, and the power supply unit 490 may be incorporated into a single unit, or some of the wireless communication unit 410, the A/V input unit 420, the user input unit 430, the sensing unit 440, the output unit 450, the memory 460, the interface unit 470, the controller 480, and the power supply unit 490 may be divided into two or more smaller units.

The wireless communication unit 410 may include a broadcast reception module 411, a mobile communication module 413, a wireless Internet module 415, a short-range communication module 417, and a GPS module 419.

The broadcast reception module 411 receives a broadcast signal and/or broadcast-related information from an external broadcast management server through a broadcast channel. Examples of a broadcast channel include a satellite channel and a terrestrial channel. The broadcast management server may be a server which generates broadcast signals and/or broadcast-related information and transmits the generated broadcast signals and/or the generated broadcast-related information or a server which receives and then transmits previously-generated broadcast signals and/or previously-generated broadcast-related information.

Examples of broadcast-related information include broadcast channel information, broadcast program information, and broadcast service provider information. Examples of the broadcast signal include a TV broadcast signal, a radio broadcast signal, a data broadcast signal, or the combination of a data broadcast signal and either a TV broadcast signal or a radio broadcast signal. The broadcast-related information may be provided to MS 102 through a mobile communication network. In this case, the broadcast-related information may be received by the mobile communication module 413, rather than by the broadcast reception module 411. The broadcast-related information may come in various forms, for example, electronic program guide (EPG) of digital multimedia broadcasting (DMB) or electronic service guide (ESG) of digital video broadcast-handheld (DVB-H).

Broadcast reception module 411 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 411 may be configured to be suitable for nearly all types of broadcasting systems other than those set forth herein.

The broadcast signal and/or the broadcast-related information received by the broadcast reception module 411 may be stored in memory 460.

The mobile communication module 413 transmits wireless signals to or receives wireless signals from at least one or more of a base station, an external station, and a server through a mobile communication network. The wireless signals may include various types of data according to whether the MS 102 transmits/receives voice call signals, video call signals, or text/multimedia messages.

The wireless Internet module 415 may be a module for wirelessly accessing the Internet. The wireless Internet module 415 may be embedded in the MS 102 or may be installed in an external device.

The short-range communication module 417 may be a module for short-range communication. The short-range communication module 417 may use various short-range communication techniques such as Bluetooth®, radio frequency identification (RFID), infrared data association (IrDA), ultra wideband (UWB), and ZigBee®.

The GPS module 419 may receive position information from one or more satellites (e.g., GPS satellites).

The A/V input unit 420 may be used to receive audio signals or video signals. The A/V input unit 420 may include one or more cameras 421 and a microphone 423. The camera 421 processes various image frames such as still images or moving images captured by an image sensor during a video call mode or an image capturing mode. The image frames processed by the camera 421 may be displayed by a display module 451.

The image frames processed by the camera 421 may be stored in the memory 460 or may be transmitted outside the MS 102 through the wireless communication unit 410. The MS 102 may include more than two cameras.

The microphone 423 receives external sound signals during a call mode, a recording mode, or a voice recognition mode with the use of a microphone and converts the sound signals into electrical sound data. In the call mode, the mobile communication module 413 may convert the electrical sound data into data that can be readily transmitted to a mobile communication base station and then output the data obtained by the conversion. The microphone 423 may use various noise removal algorithms to remove noise that may be generated during the reception of external sound signals.

The user input unit 430 generates key input data based on user input for controlling the operation of the MS 102. The user input unit 430 may be implemented as a keypad, a dome switch, a touch pad (either static pressure or constant electricity), a jog wheel, or a jog switch. In particular, if the user input unit 430 is implemented as a touch pad and forms a mutual layer structure along with the display module 451, the user input unit 430 and the display module 451 may be collectively referred to as a touch screen.

The sensing unit 440 determines a current state of the MS 102 such as whether the MS 102 is opened or closed, the position of the MS 102 and whether the MS 102 is placed in contact with a user. In addition, the sensing unit 440 generates a sensing signal for controlling the operation of the MS 102.

For example, when the MS 102 is a slider-type mobile phone, the sensing unit 440 may determine whether the MS 102 is opened or closed. In addition, the sensing unit 440 may determine whether the MS 102 is powered by the power supply unit 490 and whether the interface unit 470 is connected to an external device.

The sensing unit 440 may include an acceleration sensor 443. Acceleration sensors are a type of device for converting an acceleration variation into an electric signal. With recent developments in micro-electromechanical system (MEMS) technology, acceleration sensors have been widely used in various products for various purposes. For example, an acceleration sensor may be used as an input device for a computer game and may sense the motion of the human hand during a computer game.

Two or three acceleration sensors 443 representing different axial directions may be installed in the MS 102. Alternatively, only one acceleration sensor 443 representing a Z axis may be installed in the MS 102.

The output unit 450 may output audio signals, video signals, and alarm signals. The output unit 450 may include the display module 451, an audio output module 453, and an alarm module 455.

The display module 451 may display various information processed by the MS 102. For example, if the MS 102 is in a call mode, the display module 451 may display a user interface (UI) or a graphical user interface (GUI) for making or receiving a call. If the MS 102 is in a video call mode or an image capturing mode, the display module 451 may display a UI or a GUI for capturing or receiving images.

If the display module 451 and the user input unit 430 form a mutual layer structure and are thus implemented as a touch screen, the display module 451 may be used not only as an output device but also as an input device. If the display module 451 is implemented as a touch screen, the display module 451 may also include a touch screen panel and a touch screen panel controller.

The touch screen panel is a transparent panel attached onto the exterior of the MS 102 and may be connected to an internal bus of the MS 102. The touch screen panel monitors whether the touch screen panel is touched by a user. Once a touch input to the touch screen panel is detected, the touch screen panel transmits a number of signals corresponding to the touch input to the touch screen panel controller.

The touch screen panel controller processes the signals transmitted by the touch screen panel and transmits the processed signals to the control unit 480. The control unit 480 then determines whether a touch input has been generated and which part of the touch screen panel has been touched based on the processed signals transmitted by the touch screen panel controller.

As described above, if the display module 451 and the user input unit 430 form a mutual layer structure and are thus implemented as a touch screen, the display module 451 may be used not only as an output device but also as an input device. The display module 451 may include at least one of a liquid crystal display (LCD), a thin film transistor (TFT)-LCD, an organic light-emitting diode (OLED), a flexible display, and a three-dimensional (3D) display.

The MS 102 may include two or more display modules 451. For example, the MS 102 may include an external display module and an internal display module.

The audio output module 453 may output audio data received by the wireless communication unit 410 during a call reception mode, a call mode, a recording mode, a voice recognition mode, or a broadcast reception mode or may output audio data present in the memory 460. In addition, the audio output module 453 may output various sound signals associated with the functions of the MS 102 such as receiving a call or a message. The audio output module 453 may include a speaker and a buzzer.

The alarm module 455 may output an alarm signal indicating the occurrence of an event in the MS 102. Examples of the event include receiving a call signal, receiving a message, and receiving a key signal. Examples of the alarm signal output by the alarm module 455 include an audio signal, a video signal, and a vibration signal.

The alarm module 455 may output a vibration signal upon receiving a call signal or a message. In addition, the alarm module 455 may receive a key signal and may output a vibration signal as feedback to the key signal.

Once a vibration signal is output by the alarm module 455, the user may recognize that an event has occurred. A signal for notifying the user of the occurrence of an event may be output by the display module 451 or the audio output module 453.

The memory 460 may store various programs necessary for the operation of the controller 480. In addition, the memory 460 may temporarily store various data such as a phonebook, messages, still images, or moving images.

The memory 460 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The MS 102 may operate a web storage, which performs the functions of the memory 460 on the Internet.

The interface unit 470 may interface with an external device that can be connected to the MS 102. The interface unit 470 may be a wired/wireless headset, an external battery charger, a wired/wireless data port, a card socket such as for a memory card or a subscriber identification module (SIM)/user identity module (UIM) card, an audio input/output (I/O) terminal, a video I/O terminal, or an earphone.

The interface unit 470 may receive data from an external device or may be powered by an external device. The interface unit 470 may transmit data provided by an external device to other components in the MS 102 or may transmit data provided by other components in the MS 102 to an external device.

The controller 480 may control the general operation of the MS 102. For example, the controller 480 may perform various control operations regarding making/receiving a voice call, transmitting/receiving data, or making/receiving a video call.

The controller 480 may include a multimedia play module 481, which plays multimedia data. The multimedia play module 481 may be implemented as a hardware device and may be installed in the controller 480. Alternatively, the multimedia play module 481 may be implemented as a software program.

The power supply unit 490 is supplied with power by an external power source or an internal power source and supplies power to other components in the MS 102.

Figure 5:
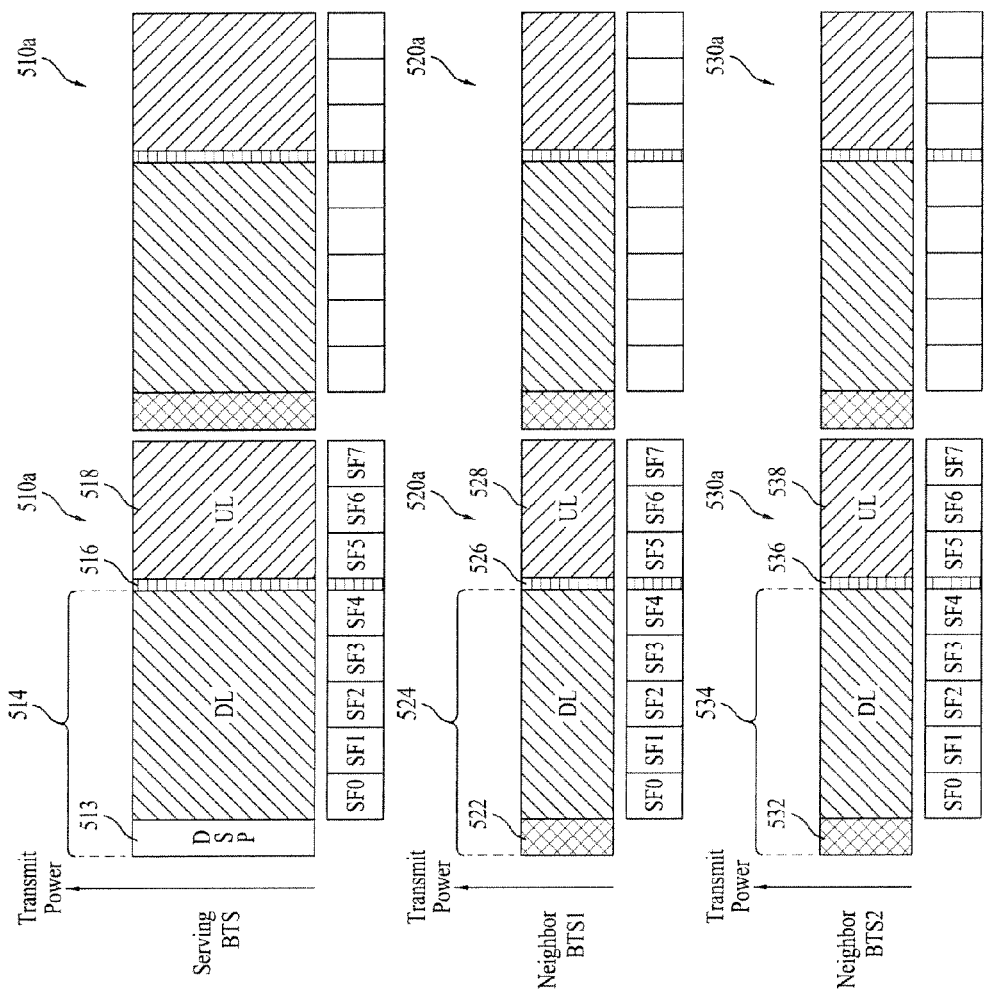
FIG. 5 depicts communication frames in accordance with various embodiments of the present invention.

FIG. 5 depicts communication frames in accordance with various embodiments of the present invention. In particular, this figure includes frame 510a (e.g., transmitted by serving BTS 110 as signal 110a), frame 520a (e.g., transmitted by neighbor BTS 120 as signal 120a), and frame 530a (e.g., transmitted by neighbor BTS 130). In FIG. 5, and the following figures as well, a single transmission frame will be described. However, it is to be understood that the same or similar transmission frames may transmitted in a periodic or repeating basis in accordance with the transmission protocol implemented.

The serving BTS frame 510a includes a downlink (DL) zone 514, a guard zone 516, and an uplink (UL) zone 518. The neighbor BTS 1 frame 520a includes a DL zone 524, a guard zone 526, and a UL zone 528. The neighbor BTS 2 frame 530a includes a DL zone 534, a guard zone 536, and a UL zone 538. The DL zone 524 includes a preamble period 522, and the DL zone 534 includes a preamble period 532.

The serving BTS frame 510a is also shown having a downlink silent period (DSP) 513 occurring at the beginning of the DL zone 514. According to various embodiments, DSP 513 relates to a complete or relatively silent period during which the serving BTS ceases, or substantially ceases, transmission to one or more MSs. Techniques for accomplishing this are to reduce the transmission power of the BTS, or to terminate transmissions by the BTS. In some cases, DSP 513 occurs during a time period that defines a transmission power modification period.

One potential benefit of the depicted embodiment is that during some or all of DSP 513, reception by MS 102 of signaling (e.g., pilot signals) provided by one or more neighboring BTS (e.g., BTS 120, 130) can be enhanced or otherwise facilitated. According to one embodiment, serving BTS 110 can initiate DSP 513 during one or more preamble periods to increase the ability of a MS to detect pilot signals from distant neighboring base stations, and can also inform the MS regarding the details of an upcoming DSP. Alternatively or additionally, the serving BTS can decrease or increase the transmit power used in transmitting the serving frame 510a during the DSP.

In some embodiments, the MS may calculate a location or position estimate of itself based upon one or more preambles broadcasted or otherwise transmitted by one or more neighboring BTSs. Such embodiments apply to the FIG. 5 example, and to the examples set out the following figures as well.

According to yet other embodiments, the serving BTS may apply the DSP at any point during its transmission for increasing the ability of a MS to detect other types of signals. This feature is often implemented when the serving BTS or the communication network determines that other types of signals, such as pilot signal, may be useful to the MS. In some embodiment, such techniques permit or facilitate the MS to perform positioning operations or techniques.

If desired, before serving BTS 110 implements a DSP in its transmission of data in the DL zone, the serving BTS 110 may inform various MSs details (e.g., timing) of this DSP. For instance, the MS may be informed independently by the serving BTS, or with some coordination among multiple BTS present within the communication network. As a result, it is common that fewer collisions will result when the DSP is applied between BTSs.

Another alternative includes applying the DSP upon the occurrence of a particular event, such as when a MS is turned on, activated, and the like. For example, the DSP may be applied by serving BTS 110 according to a request from one or more of MS 102, a neighbor BTS 120, 130, the network, mobile location center (MLC), positioning determination entity (PDE), combinations thereof, and the like. As a further example, serving BTS 110 may randomly apply the DSP either with or without coordination of other entities, such as those just described.

It is further understood that the DSP feature can be applied with respect to various preamble or pilot signal design scenarios. In some embodiments, synchronous preamble periods can be used such that the preamble period 522 of neighbor BTS 120 and preamble period 532 of neighbor BTS 130 are substantially or entirely concurrent, such that each neighbor BTS transmits preambles (also referred to herein as a pilot signal or pilot) in a substantially or entirely concurrent manner during DSP 513. As a result, DSP 513 mitigates or eliminates actual or potential interference between the preambles or other transmissions occurring during preamble periods 522 and 532. In some cases, this increases the ability of a MS to detect or receive transmitted preambles and other signaling. In other embodiments, the DSP feature may be implemented in an asynchronous manner such that asynchronous or time-staggered preamble periods are implemented by one or more BTSs operating within the network. Examples of such embodiments will now be described.

Figure 6:
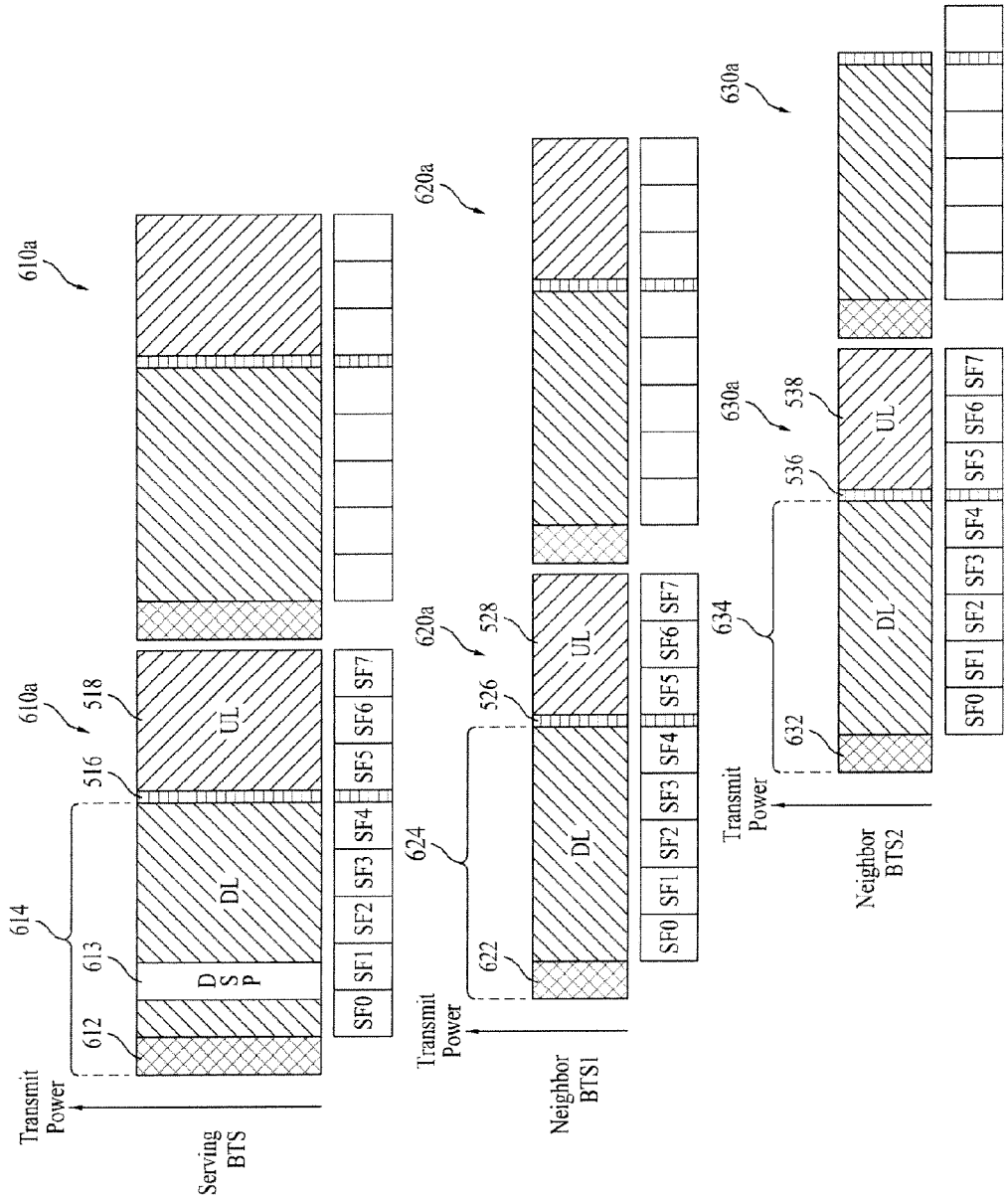
FIG. 6 depicts communication frames in accordance with additional various embodiments of the present invention.

FIG. 6 depicts communication frames in accordance with various embodiments of the present invention. In particular, this figure includes frame 610a (e.g., transmitted by serving BTS 110 as signal 110a), frame 620a (e.g., transmitted by neighbor BTS 120 as signal 120a), and frame 630a (e.g., transmitted by neighbor BTS 130).

The serving BTS frame 610a includes a DL zone 614, a guard zone 516, and an UL zone 518. The DL zone 614 includes a preamble period 612. The neighbor 1 BTS frame 620a includes a DL zone 624, a guard zone 526, and a UL zone 528. The neighbor 2 BTS frame 630a includes a DL zone 634, a guard zone 536, and a UL zone 538. The DL zone 624 includes a preamble period 622, and the DL zone 634 includes a preamble period 632.

Serving BTS frame 610a is also shown having DSP 613 occurring during the DL zone 614. DSP 613 may be implemented using the same or similar techniques as previously described with regard to FIG. 5.

The preamble period 622 of neighbor BTS 1 and the preamble period 632 of the neighbor BTS 2 are shown occurring during different time periods in a time-staggered fashion. As such, the serving BTS, such as serving BTS 110, applies or implements DSP 613 during a period of time when preambles from neighbor BTS 1 and 2 are transmitted.

For example, as shown in FIG. 6, the serving BTS applies DSP 613 during a time period when neighbor BTS 1 transmits a preamble, that is, during downlink slot frame (SF) 0 and SF 1. As a result, the ability of a MS, such as MS 102, to detect the preamble transmitted during the preamble period 622 and possibly other signals from the neighbor BTS 1 is increased.

In some embodiments, MS 102 may be informed as to when a DSP will be implemented using, for example, any of the techniques previously described. Accordingly, the MS can be configured to measure the pilot signals and/or other signals transmitted during such DSP periods.

Figure 7:
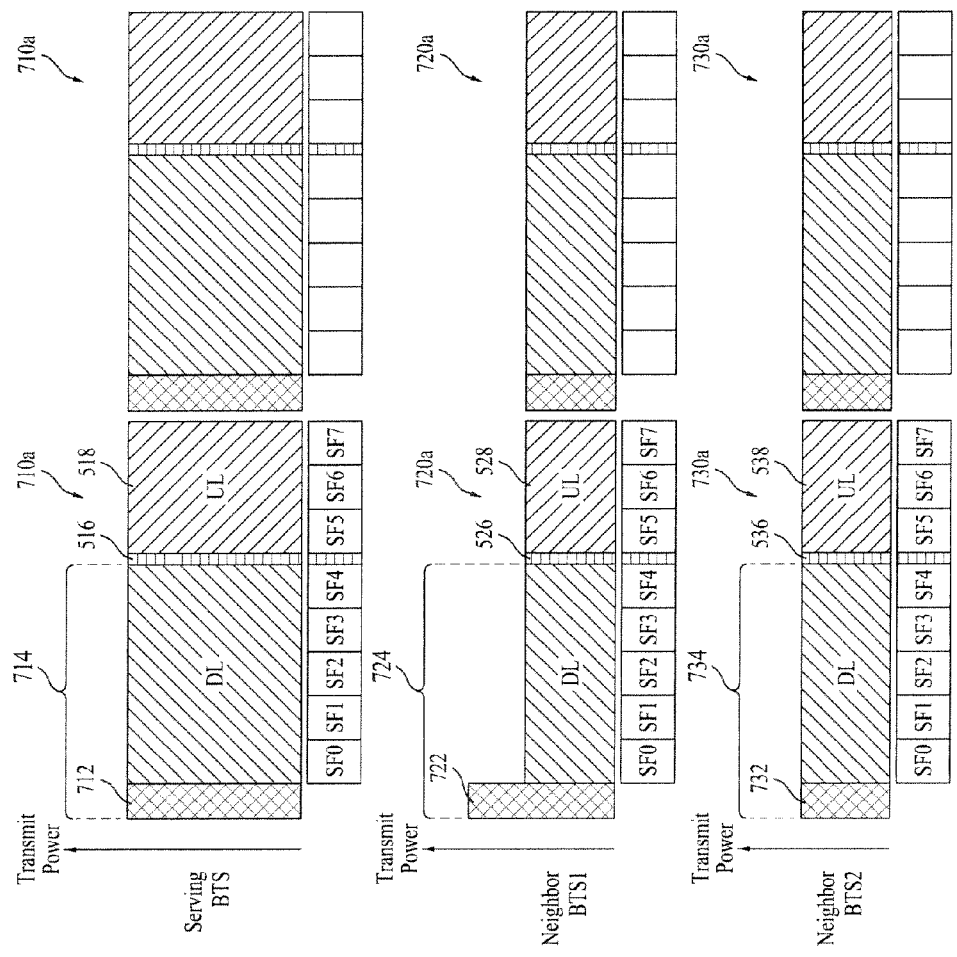
FIG. 7 depicts communication frames in accordance with further embodiments of the present invention.

FIG. 7 depicts communication frames in accordance with further embodiments of the present invention. The illustrated embodiment is similar in many respects to the embodiment of FIG. 5. One difference is that the FIG. 7 embodiment relates to increasing transmission power of one or more neighbor BTSs, which is different than the use of a silent period in the FIG. 5 embodiment.

For example, in FIG. 7, the serving BTS frame 710a includes a DL zone 714 having a preamble period 712, neighbor BTS 1 includes a DL zone 724 having a preamble period 722, and neighbor BTS 2 includes a DL zone 734 having a preamble period 732. In accordance with some embodiment, some or all of the preamble periods 712, 722, 732 are partially or completely concurrent, such that the serving BTS, the neighbor BTS 1, the neighbor BTS 2 transmits their respective preambles in a substantially or completely concurrent manner. In other embodiments, such preamble periods include overlapping time periods.

In FIG. 7, the strength of preamble 722 of neighbor BTS 1 is greater relative to transmission strength of data or other transmission (e.g., preambles) transmitted by other BTSs. Typically, this feature is implemented by varying over time which of a plurality of neighbor BTSs transmit using a relatively increased preamble strength, and which of a plurality of neighbor BTSs do not transmit a preamble at such an increased strength. As with all embodiments presented herein, this increase in transmission strength may be relative to previous transmissions of an associated neighbor BTS, relative to transmission strength of UL data of an associated neighbor BTS, relative to transmission strength of other neighbor BTSs, relative to transmission strength of preambles or data transmitted by a serving BTS, combinations thereof, and the like.

The preamble of neighbor BTS 1 is shown transmitted during preamble period 722 with a transmission power or strength that is greater than the transmission power of the preamble transmitted by neighbor BTS 2 during the preamble period 732. As a result, the increased transmission power of the preamble transmitted during preamble period 722 can increase the ability of the MS to detect this preamble.

Figure 8:
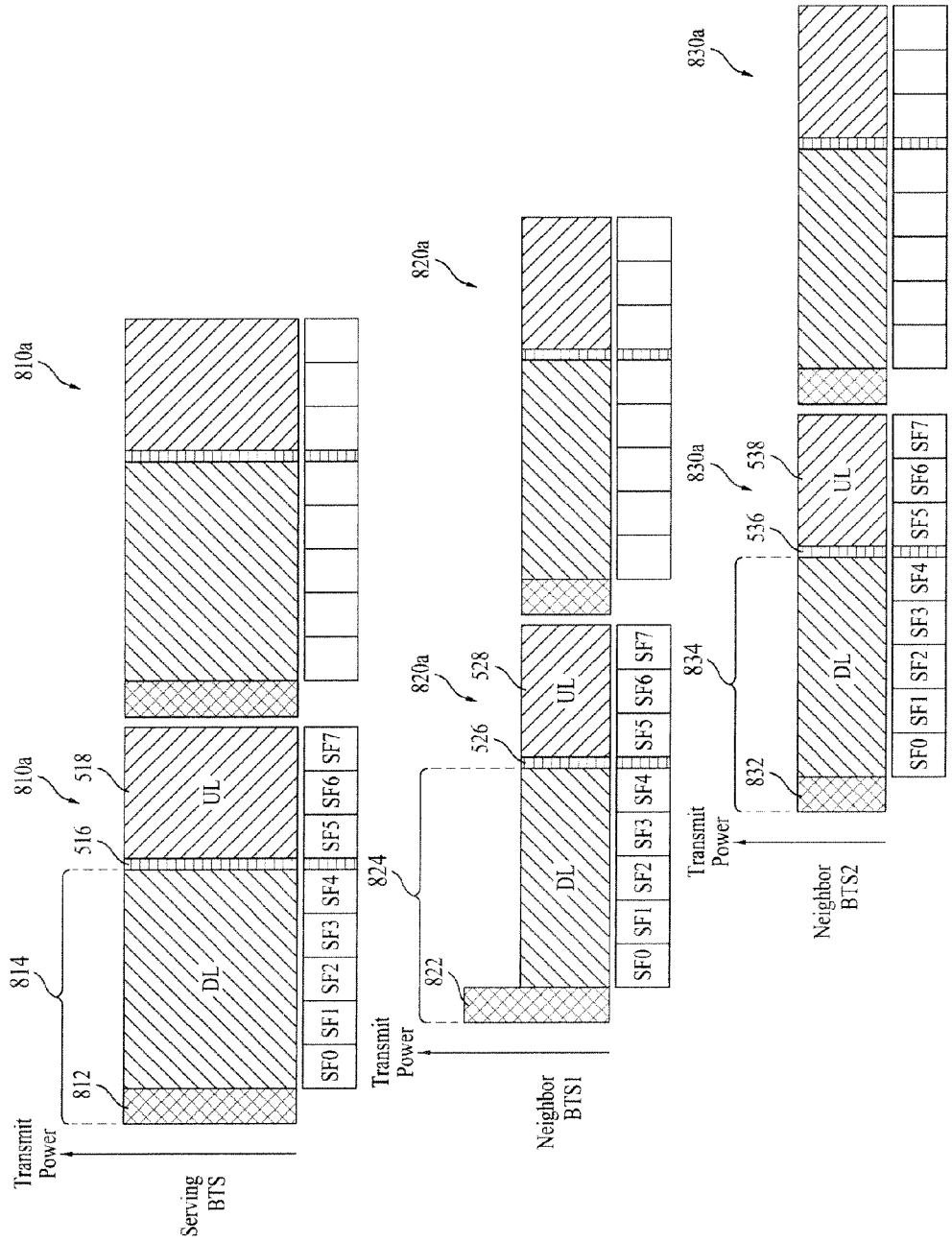
FIG. 8 depicts communication frames in accordance with yet further various embodiments of the present invention.

FIG. 8 depicts communication frames in accordance with further various embodiments of the present invention. The illustrated embodiment includes features similar to those shown in both FIG. 6 (e.g., offset or asynchronous transmission of preambles) and FIG. 7 (e.g., increased preamble strength). The serving BTS frame 810*a* includes a DL zone 814 having preamble period 812, the neighbor 1 BTS frame 820*a* includes a DL zone 824 having preamble period 822, and the neighbor BTS frame 830*a* includes a DL zone 834 having a preamble period 832.

Similar to that of FIG. 6, the preambles of the neighbor BTSs are transmitted at different times in a time-staggered fashion. Moreover, similar to that shown in FIG. 7, the preamble 822 of the neighbor BTS 1 120 is transmitted with a relatively greater transmission power or strength than other portions of the communication frame 820*a*. Alternatively or additionally, the preamble strength of preamble 822 is greater relative transmission strength of other BTS (e.g., other neighbor BTSs, serving BTS, and the like). If desired, the timing and/amount of the increase in preamble strength may be at the request of the serving BTS, other entity as set forth above with regard to FIG. 5.

Similar to other embodiments, the increased strength preamble of FIG. 8 may be implemented by varying over time which of a plurality of neighbor BTSs transmit using a relatively increased preamble strength, and which of a plurality of neighbor BTSs do not transmit a preamble at such an increased strength. In addition, MS 102 may be informed as to when the preamble strength will occur using, for example, any of the techniques previously described. Accordingly, it is possible for the MS 102 to realize an increased ability to detect the increased strength preamble.

Figure 9:
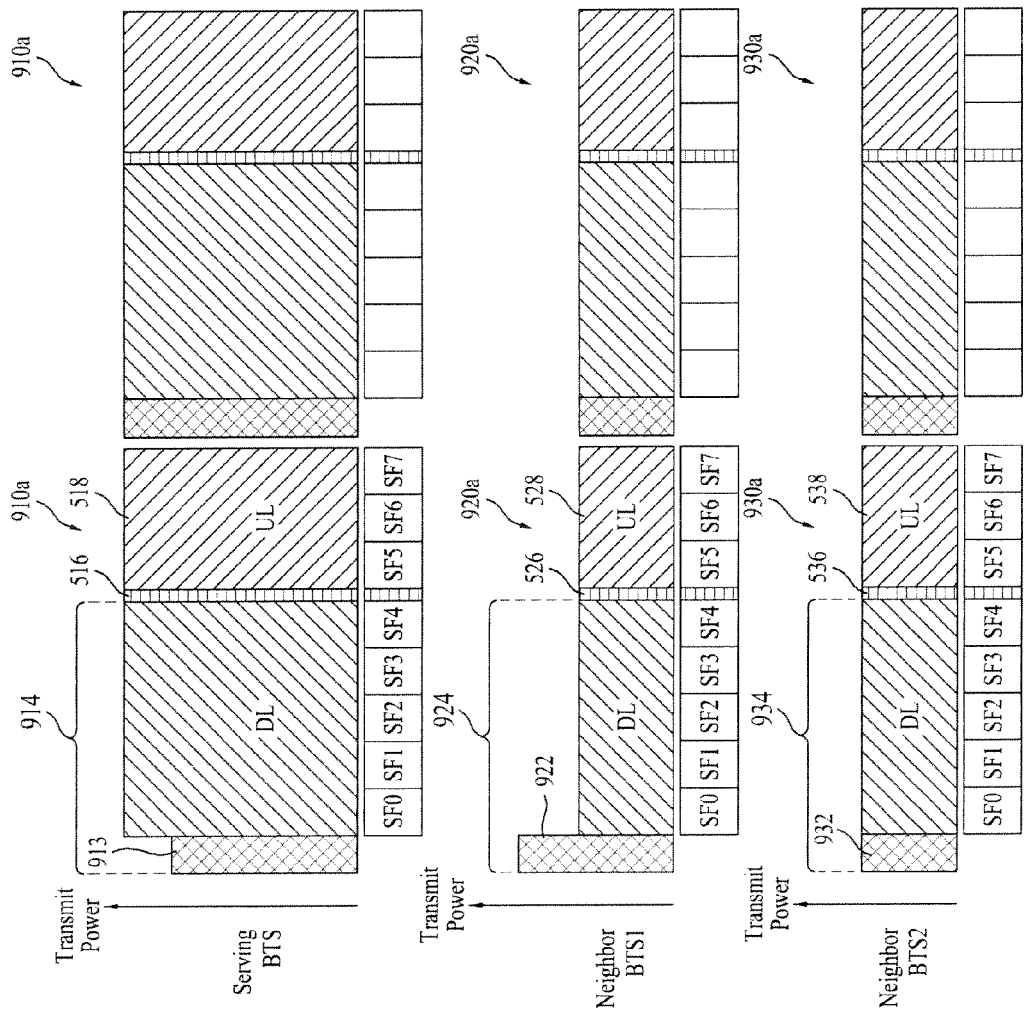
FIG. 9 depicts communication frames in accordance with still further embodiments of the present invention.

FIG. 9 depicts communication frames in accordance with still further embodiments of the present invention. The illustrated embodiment is similar in many respects to the embodiment of FIG. 7. In FIG. 9, the serving BTS frame 910*a* includes a DL zone 914 having a DSP period 913, neighbor BTS 1 includes a DL zone 924 having a preamble period 922, and neighbor BTS 2 includes a DL zone 934 having a preamble period 932. In accordance with some embodiments, some or all of the preamble periods 913, 922, 932 are partially or completely concurrent, such that the serving BTS, the neighbor BTS 1, and the neighbor BTS 2 transmits their respective preambles in a substantially or completely concurrent manner. In other embodiments, such preamble periods include overlapping time periods.

Moreover, the preamble 922 of the neighbor BTS 1 is transmitted with a relatively greater transmission power or strength than other portions of the communication frame 920*a*. Alternatively or additionally, the preamble strength of preamble 922 is greater relative to transmission strength of other BTS (e.g., other neighbor BTSs, serving BTS, and the like).

In the embodiment of FIG. 9, the serving BTS applies the DSP 913 by reducing the transmission power to be less than the transmission power used for other portions of the serving BTS communication frame 910*a*. As a result, the ability of the MS 102 to detect the preamble transmitted during the preamble period 922, and possibly other signals, is increased.

Similar to other embodiments, the increased strength preamble of FIG. 9 may be implemented by varying over time which of a plurality of neighbor BTSs transmit using a relatively increased preamble strength, and which of a plurality of neighbor BTSs do not transmit a preamble at such an increased strength. In addition, MS 102 may be informed as to when the preamble strength will occur using, for example, any of the techniques previously described. Accordingly, it is possible for the MS 102 to realize an increased ability to detect the increased strength preamble.

Figure 10:
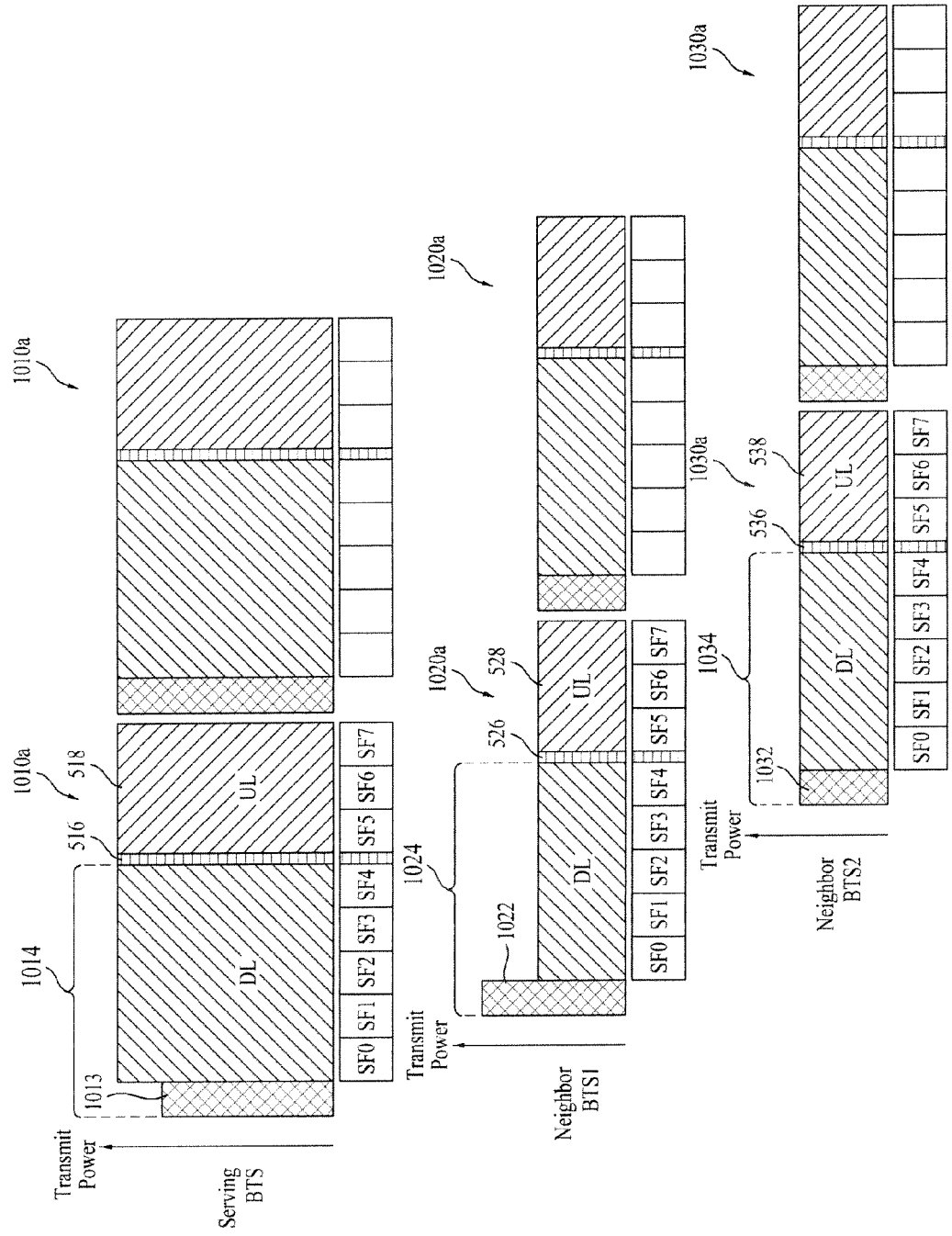
FIG. 10 depicts communication frames in accordance with still additional embodiments of the present invention.

FIG. 10 depicts communication frames in accordance with still additional embodiments of the present invention. The illustrated embodiments include features similar to those shown in both FIG. 6 (offset or asynchronous preamble transmission) and FIG. 9 (e.g., increased preamble strength and DSP). The serving BTS frame 1010*a* includes a DL zone 1014 having DSP 1013, the neighbor 1 BTS frame 1020*a* includes a DL zone 1024 having preamble period 1022, and the neighbor BTS frame 1030*a* includes a DL zone 1034 having a preamble period 1032.

The preamble period 1022 of neighbor BTS 1 and the preamble period 1032 of the neighbor BTS 2 are shown occurring during different time periods in a time-staggered fashion. The serving BTS, such as BTS 110, applies or implements DSP 1013 during a period of time that is different from when preambles from neighbor BTS 1 and 2 are transmitted. For example, the serving BTS can also reduce transmission strength during a period substantially coinciding with preamble period 1022 of frame 1020*a*, that is, during downlink slot frame (SF) 1 and SF 2.

Moreover, the preamble 1022 of the neighbor BTS 1 is transmitted with a relatively greater transmission power or strength than other portions of the communication frame 1020*a*. Alternatively or additionally, the preamble strength of preamble 1022 is greater relative to transmission strength of other BTS (e.g., other neighbor BTSs, serving BTS, and the like).

Further, in the embodiment of FIG. 10, the serving BTS applies the DSP 1013 by reducing the transmission power to be less than the transmission power used for other portions of the serving BTS communication frame 1010*a*. As a result, the ability of the MS 102 to detect the preamble transmitted during the preamble period 1022, and possibly other signals, is increased. Alternatively or additionally, DSP 1013 may be implemented by reducing the transmission power relative to previous transmissions of the preamble, relative to transmission strength of DL data transmitted by the serving BTS, relative to transmission strength of other neighbor BTSs, combinations thereof, and the like.

In some embodiments, MS 102 may be informed as to when DSP 1013, and/or preamble 1022 will be implemented using, for example, any of the techniques previously described. Similar to other embodiments, the increased strength preamble of FIG. 10 may be implemented by varying over time which of a plurality of neighbor BTSs transmit using a relatively increased preamble strength, and which of a plurality of neighbor BTSs do not transmit a preamble at such an increased strength. Accordingly, it is possible for the MS 102 to realize an increased ability to detect the increased strength preamble.

As previously noted, the various transmission frames set out above may be implemented in any of a variety of wireless transmission formats, including various WiMAX transmission standard formats. In such embodiments, as well as other embodiments, a DSP may be implemented using a message format as set forth in the following Table 1.

TABLE 1

| Type | Length | Value | Comment |
|---|---|---|---|
| XXX | 1 | 0: NO DPS available<br>1: Power Up 3 dB on Preamble<br>2: Power Up 6 dB on Preamble<br>3: Power Up 9 dB on Preamble<br>4: Reserved<br>5: Reserved<br>6: Power up 3 dB on a special pilots.<br>7: Power up 6 dB on a special pilots<br>8: Power up 9 dB on a special pilots<br>9: Reserved<br>10: Reserved<br>11: No Transmission on Preamble<br>12: Power Down 3 dB on Preamble<br>13: Power Down 6 dB on Preamble<br>14: Reserved<br>15: Reserved<br>16: No Transmission on a special pilots.<br>17: Power Down 3 dB on a special pilots<br>18: Power Down 6 dB on a special pilots<br>19: Reserved<br>20: Reserved | Special pilots can be any predefined pilots. |

Figure 11:
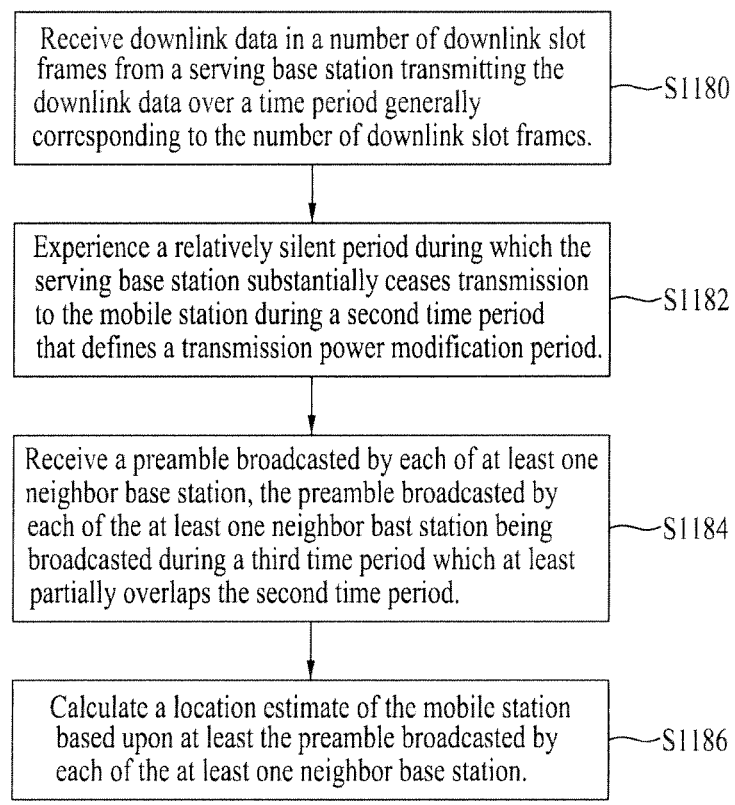
FIG. 11 is a flowchart depicting a method for acquiring positioning information according to various embodiments of the present invention.

FIG. 11 is a flowchart depicting a method for acquiring positioning information according to various embodiments of the present invention. As shown in FIG. 11, the at least one MS 102 receives downlink data in a number of downlink slot frames from a serving base station, such as the serving BTS 110, transmitting the downlink data over a time period generally corresponding to the number of downlink slot frames (S1180). A relatively silent period is then experienced during which the serving base station substantially ceases transmission to the at least one MS 102 during a second time period that defines a transmission power modification period (S1182).

The at least one MS 102 receives a preamble broadcasted by each of at least one neighbor base station, such as the neighbor BTS 1 120 and the neighbor BTS 2 130, the preamble broadcasted by each of the at least one neighbor base station being broadcasted during a third time period which at least partially overlaps the second time period (S1184). The location estimate of the at least one MS 102 is then calculated based upon at least the preamble broadcasted by each of the at least one neighbor base station (S1186).

In alternative implementations, certain logic operations may be performed in a different order, modified or removed and still implement preferred embodiments of the present invention. Moreover, operations may be added to the above described logic and still conform to assorted implementations of the invention.

Furthermore, the described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.)). Code in the computer readable medium is accessed and executed by a processor.

The code in which preferred embodiments are implemented may further be accessible through a transmission media or from a file server over a network. In such cases, the article of manufacture in which the code is implemented may include a transmission media, such as a network transmission line, wireless transmission media, signals propagating through space, radio waves, infrared signals, etc. Of course, those skilled in the art will recognize that many modifications may be made to this configuration, and that the article of manufacture may comprise any information bearing medium known in the art.

The logic implementation shown in the figures describe specific operations as occurring in a particular order. In alternative implementations, certain logic operations may be performed in a different order, modified or removed and still implement certain embodiments of the present invention. Moreover, operations may be added to the above described logic and still conform to the described implementations.

The foregoing embodiments and advantages are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for acquiring positioning information at a mobile station, the method comprising:
    receiving downlink data from a serving base station during a first time period of a frame;
    receiving a preamble from a first neighbor base station during a second time period of the frame;
    receiving a preamble from a second neighbor base station during a third time period of the frame; and
    calculating a location of the mobile terminal based on the preamble transmitted from the first neighbor base station and based upon the preamble from the second neighbor base station, wherein a transmission power level of the downlink data transmitted from the serving base station during the first time period of the frame is less than a transmission power level of the serving base station during a time period other than the first time period of the frame,
    wherein a transmission power level of the preamble transmitted from the first neighbor base station during the second time period of the frame is more than a transmission power level of the first neighbor station during a time period other than the second time period of the frame,
    wherein the power level of the preamble transmitted from the first neighbor base station is more than the transmission power level of downlink data transmitted from the serving base station,
    wherein the first time period of the frame is time-aligned or partially overlapped with the second time period of the frame
    wherein the transmission power level of the preamble transmitted from the second neighbor base station during the third time period of the frame is less than the transmission power level of the preamble transmitted from the first neighbor base station during the second time period of the frame,
    wherein the third time period of the frame is time-aligned or partially overlapped with the first and second time periods of the frame.

2. The method according to claim 1, wherein the transmission power level of the preamble transmitted from the second neighbor base station during the third time period of the frame is the same as the transmission power level of the first neighbor base station during a time period other than the third time period of the frame.

3. The method according to claim 1, further comprising:
receiving timing information of at least one of the first time period, the second time period, and third time period of the frame.

4. The method according to claim 1, wherein the preamble transmitted from the first neighbor base station and the preamble from the second neighbor base station each comprises a pilot signal.

5. The method according to claim 1, wherein the transmission power level of the preamble transmitted from the second neighbor base station during the third time period of the frame is more than the transmission power level of the downlink data transmitted from the serving base station during the first time period of the frame.

6. The method according to claim 1, wherein the frame is a Time Division Duplex (TDD) frame.

* * * * *